United States Patent
Schaefer et al.

[11] Patent Number: 5,806,751
[45] Date of Patent: Sep. 15, 1998

[54] METHOD OF REPAIRING METALLIC ALLOY ARTICLES, SUCH AS GAS TURBINE ENGINE COMPONENTS

[75] Inventors: Robert P. Schaefer, East Hartford; William F. Bender, Columbia, both of Conn.; Matthew J. Arnold, Charlotte, N.C.

[73] Assignee: United Technologies Corporation, Hartford, Conn.

[21] Appl. No.: 733,293

[22] Filed: Oct. 17, 1996

[51] Int. Cl.[6] .............................. B23K 31/02; B23P 6/04; B22F 7/04
[52] U.S. Cl. ........................ 228/119; 228/226; 228/248.5; 228/262.31; 29/889.1
[58] Field of Search ..................... 228/119, 225, 228/226, 248.1, 248.5, 262.3, 262.31; 148/527, 528, 537; 29/527.1, 527.2, 889.1

[56] References Cited

U.S. PATENT DOCUMENTS

| | | | |
|---|---|---|---|
| 3,678,570 | 7/1972 | Paulonis et al. | 29/498 |
| 4,008,844 | 2/1977 | Duvall et al. | 228/119 |
| 4,073,639 | 2/1978 | Duvall et al. | 75/0.5 R |
| 4,208,222 | 6/1980 | Barlow et al. | 148/6 |
| 4,381,944 | 5/1983 | Smith, Jr. et al. | 75/225 |
| 4,493,451 | 1/1985 | Clark et al. | 228/119 |
| 4,705,203 | 11/1987 | McComas et al. | 228/119 |
| 4,726,101 | 2/1988 | Draghi et al. | 29/156.8 |
| 4,878,953 | 11/1989 | Saltzman et al. | 228/119 |
| 5,071,054 | 12/1991 | Dzugan et al. | 228/119 |
| 5,156,321 | 10/1992 | Liburdi et al. | 228/119 |
| 5,240,491 | 8/1993 | Budinger et al. | 75/255 |
| 5,395,584 | 3/1995 | Berger et al. | 228/119 |
| 5,437,737 | 8/1995 | Draghi et al. | 148/23 |

FOREIGN PATENT DOCUMENTS 0 353 843 A1  2/1990  European Pat. Off. .

OTHER PUBLICATIONS

Y. Zhou, W.F. Gale, and T.H. North "Modelling of transient liquid phase bonding", 1995 vol. 40 No. 516 pgs.

*Primary Examiner*—Samuel M. Heinrich
*Attorney, Agent, or Firm*—Brooks Haidt Haffner and Delahunty

[57] ABSTRACT

A method of repairing a metallic alloy article having a defect cavity greater than about 0.010 inches ($2.5 \times 10^{-4}$ m) in maximum width is disclosed. One aspect of the invention includes providing a first metallic filler material (10) in the defect cavity such that the first metallic filler material (10) substantially fills the cavity. The composition of the first metallic filler material (10) corresponds substantially to that of the metallic article. A second metallic filler material (12) is provided over the first metallic filler material (10). The second metallic filler material (12) includes between about 0 wt. % and about 40 wt. % metallic filler material of a composition corresponding substantially to the metallic article, and between about 100 wt. % and about 60 wt. % metallic filler material having the same basis as the composition of the metallic alloy article and including a melting point depressant in an amount substantially in excess of that in the metallic alloy article. The article is thermally processed through a heat treatment to effect an isothermal solidified repair.

10 Claims, 1 Drawing Sheet

METHOD OF REPAIRING METALLIC ALLOY ARTICLES, SUCH AS GAS TURBINE ENGINE COMPONENTS

BACKGROUND OF THE INVENTION

1. Technical Field

The present invention relates generally to a method of repairing metallic alloy articles, and particularly to the repair of wide gap defects in gas turbine engine components.

2. Background Information

Gas turbine engine components, such as blades and vanes, are typically manufactured from nickel-base, iron-base or cobalt-base superalloys. Defects, such as fine cracks and crevices, may occur during the manufacturing process, as well as after extensive engine service. For example, severe engine operating conditions, such as exposure to high temperatures, high pressures and hot gases may cause component surfaces to deteriorate. Exposure to the hot gases causes cracking, corrosion, oxidation, and erosion. The high temperature, pressure and rotational speeds under which gas turbine engines operate also cause creep distortion of turbine blades and vanes. As a result, turbine efficiency is lost and the vanes and blades must be repaired or replaced. Due to the high cost of these engine components, it is desirable to repair the components for subsequent use rather than replace them.

Repair techniques have been attempted in the past. For example, brazing techniques include the flowing of a molten braze material into a crack on a gas turbine engine component. Contamination problems occur, however, unless surface oxides are removed prior to filling the crack with braze material. It is also difficult to effectively repair a relatively large defect with molten braze material because upon solidification, the braze material often forms brittle eutectic phases. In addition, voids often occur as a result of shrinkage.

Another approach to the repair of gas turbine engine component defects is fusion welding. Additional cracks, however, often result because of the weld. Components repaired by fusion welding also have lower stress tolerances than that of a nonwelded component.

It is also known to use a metallic alloy filler material to repair or weld metallic alloy articles. For example, U.S. Pat. No. 4,008,884, entitled, *Method of Repairing Surface Defects Using Metallic Filler Material*, assigned to the present Assignee and incorporated by reference, describes one such method. This patent contemplates the use of a metallic filler material mix comprising a blend of particulate matter having an overall composition substantially corresponding to that of the articles being repaired. The mix is a blend of at least two distinct particulate components selected to provide a transient liquid phase of at least a portion of the mix and isothermal resolidification at a temperature below the melting point of the articles.

The process described therein is particularly successful for the repair of defects less than or equal to about 0.010 inches (0.254 mm) in maximum width. However, when wide gap defects, such as defects with a maximum width greater than about 0.010 inches (0.254 mm) at the surface are to be covered or filled, excess molten material may flow away from the defect during subsequent heat treatment and an isothermally solidified repair for this size of a defect may not result. For clarity, width is herein defined as the measurement denoted by X in FIG. 1 which is a top view of an exemplary defect of irregular size and shape.

Defects greater than about 0.010 inches (0.254 mm) in maximum width may occur during manufacture of a gas turbine engine component or after extensive engine service. When such wide gap defects occur, it is difficult, if not impossible, to produce an isothermally solidified repair. An isothermally solidified repair is desired because it results in the strongest, most ductile and oxidation resistant repair. These characteristics are essential for effective gas turbine engine operation.

Accordingly, there exists a need for a method of effectively repairing wide gap defects in metallic alloy articles.

DISCLOSURE OF THE INVENTION

The present invention relates to a method of effectively repairing wide gap defects in metallic alloy articles, such as gas turbine engine components, by achieving isothermal solidification in the repaired area.

One aspect of the invention includes a method of repairing a metallic alloy article having a defect cavity greater than about 0.010 inches ($2.5 \times 10^{-4}$ m) in maximum width. A first metallic filler material is provided in the defect cavity such that the first metallic filler material substantially fills the cavity. The composition of the first metallic filler material corresponds substantially to that of the metallic alloy article.

Alternatively, the first metallic filler material may be a blend of at least two distinct metallic filler materials. One metallic filler material, present in at least 60 wt.%, corresponds substantially to the composition of the metallic alloy article. The other metallic filler material has the same basis as the composition of the metallic alloy article and includes a melting point depressant in an amount substantially in excess of that in the article.

A second metallic filler material is provided over the first metallic filler material. The second metallic filler material includes between about 0 wt. % and about 40 wt. % metallic filler material of a composition corresponding substantially to that of the metallic alloy article, and between about 100 wt. % and about 60 wt. % metallic filler material having the same basis as the composition of the metallic alloy article and including a melting point depressant in an amount substantially in excess of that in the article.

The article is thermally processed through a heat treatment to effect an isothermally solidified repair. Specifically, the heat treatment includes heating the article to a temperature above the solidus of the second metallic filler material, such as between about 2000° F. (1093° C.) and about 2400° F. (1316° C.) for between about 5 hours and about 30 hours, to melt the second metallic filler material and isothermally solidify the repair. In this process the second metallic filler material melts and infiltrates the first metallic filler material to produce a void free structure.

Another aspect of the heat treatment of the present invention includes heating the article to a temperature (T1) capable of sintering the first metallic filler material, but below the solidus of the second metallic filler material, such as between about 2000° F. (1093° C.) and about 2400° F. (1316° C.) for about 4 hours; and then holding at a temperature (T2) above the solidus of the of the second metallic filler material, such as between about 2000° F. (1093° C.) and about 2400° F. (1316° C.) for between about 5 hours and about 30 hours, to melt the second metallic filler material and isothermally solidify the repair. Accordingly, T1 will never be equivalent to T2 which will always be greater than T1.

Yet another aspect of the invention includes the use of a first and second metallic filler paste. The first metallic filler paste includes a binder and a first metallic filler material. The composition of the first metallic filler material corresponds substantially to that of the metallic alloy article.

Alternatively, the first metallic filler material may be a blend of at least two distinct metallic filler materials. One metallic filler material, present in at least 60 wt.%, corresponds substantially to that of the metallic alloy article. The other metallic filler material has the same basis as the composition of the metallic alloy article and includes a melting point depressant in an amount substantially in excess of that in the article.

A second metallic filler paste is provided over the first metallic filler paste. The second metallic filler paste includes a binder and a second metallic filler material having between about 0 wt. % and about 40 wt. % metallic filler material of a composition corresponding substantially to that of the metallic alloy article, and between about 100 wt. % and about 60 wt. % metallic filler material having the same basis as the composition of the metallic alloy article and including a melting point depressant in an amount substantially in excess of that in the article.

The article is then thermally processes to first drive off the binder. This may be accomplished by heating the article to a low temperature, such as between about 1000° F. (538° C.) and about 1200° F. (649° C.) and holding at that temperature until the binder is driven off. Alternatively, a slow heating rate, such as about 10° F./min (6° C./min), from about 400° F. (204° C.) to between about 1000° F. (538° C.) and about 1200° F. (649° C.) may be employed until the binder is driven off. Once the binder is effectively removed, the above described heat treatments may be employed to produce an isothermally solidified repair.

An advantage of the present invention includes the ability to repair wide cracks in metallic alloy articles, such as gas turbine engine components, by achieving isothermal solidification and minimal porosity in the repaired area.

Another advantage of the present invention is the ability to achieve isothermal solidification and minimal porosity in a repair within practical thermal cycles without any subsequently applied pressure, such as hot isostatic pressing.

BEST MODE FOR CARRYING OUT THE INVENTION

The present invention includes a method of repairing a metallic alloy article, such as a gas turbine engine component. The base metal of the metallic alloy article is preferably a nickel-base, cobalt-base or iron-base superalloy.

The metallic alloy article includes a defect cavity greater than about 0.010 inches ($2.5 \times 10^{-4}$ m) in maximum width. The present invention is particularly suited for defect cavities with a maximum width between about 0.010 inches ($2.5 \times 10^{-4}$ m) and about 0.030 inches ($7.6 \times 10^{-4}$ m), regardless of defect length. However, defect cavities of other sizes may also be repaired.

The method preferably includes first removing surface oxides from the defect cavity. Typical successful procedures involve thermal processing in a reducing atmosphere such as hydrogen or hydrogen fluoride. Alternatively, a mechanical abrasion technique, such as a grinding operation may be used to remove surface oxides from the defect cavity. A combination of a mechanical abrasion technique and gas cleaning may also be used. For example, the surface oxides may be removed by first grinding out the surface damage area and then cleaning the defect cavity by thermal processing in a reducing atmosphere. However, it is not necessary to first grind out the damaged surface area.

Figure 1:
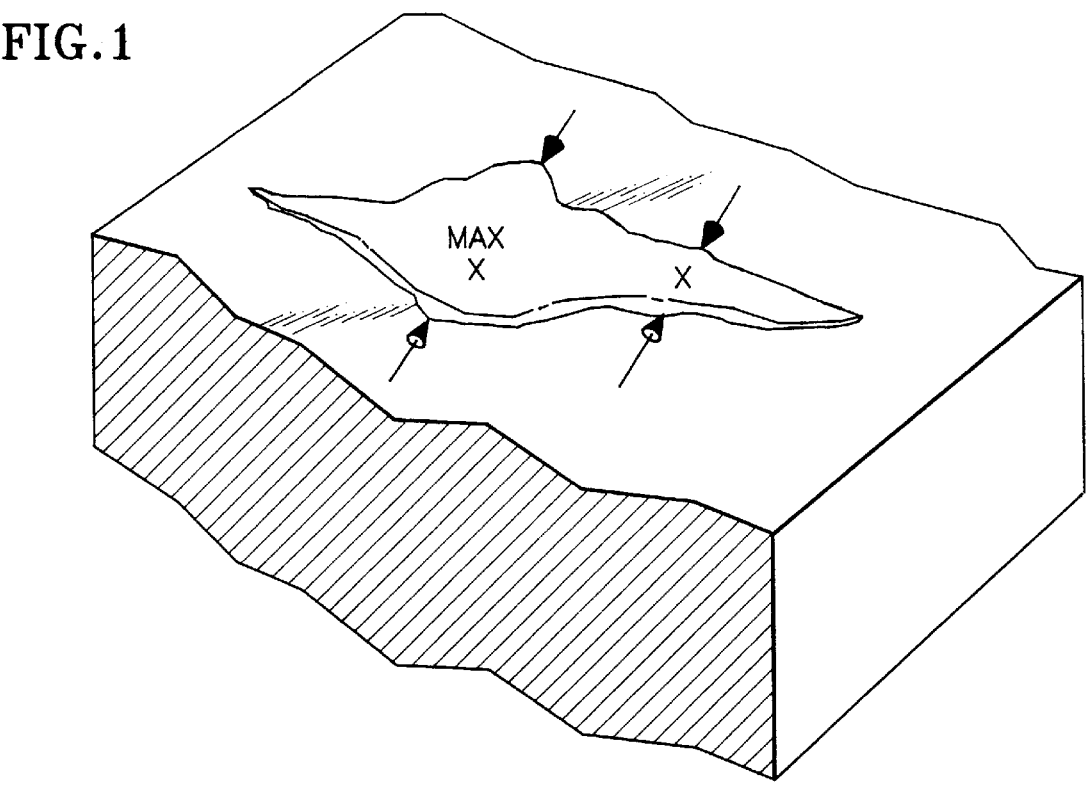
FIG. 1 depicts a top view of an exemplary defect of irregular size and shape.
Figure 2:
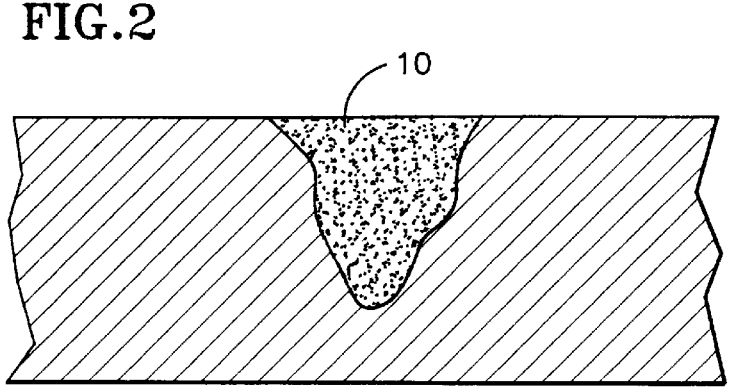
FIG. 2 depicts an aspect of the present invention wherein a first metallic filler material substantially fills the defect cavity.

Once the defect cavity is free of surface oxides, a first metallic filler material 10 is applied to the defect cavity such that the first metallic filler material 10 substantially fills the cavity, as shown in FIG. 2. The composition of the first metallic filler material 10 corresponds substantially to that of the metallic alloy article.

Alternatively, the first metallic filler material 10 may be a blend of at least two distinct metallic filler materials. One metallic filler material, present in at least 60 wt.%, corresponds substantially to that of the metallic alloy article. The other metallic filler material has the same basis as the composition of the metallic alloy article and includes a melting point depressant in an amount substantially in excess of that in the metallic alloy article. By same basis, we herein refer to a filler material employing the same base metal as that of the substrate alloy. The filler material may have somewhat of a simpler chemistry than that of the substrate alloy composition. For example, the base metal may be of a superalloy composition, whereas the filler material may be of an alloy composition.

The amount of melting point depressant employed typically ranges between about 1%, by weight, and about 10%, by weight. Preferably, between about 1%, by weight, and about 3%, by weight, boron is used. Although other melting point depressants and combinations thereof may be employed, boron is preferred because of its capability of rapid diffusion in superalloys.

Preferably, the first metallic filler material is powder in form and the size of the powder particles is about 88 microns ($1 \times 10^{-6}$ m) and finer.

Figure 3:
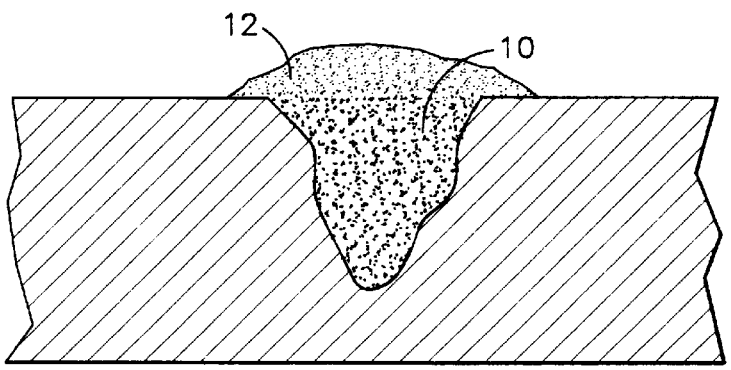
FIG. 3 depicts another aspect of the present invention wherein a second metallic filler material is provided over the first metallic filler material.

A second metallic filler material 12 is provided over the first metallic filler material 10, as shown in FIG. 3, in an amount sufficient to infiltrate the first metallic filler material 10. As shown if FIG. 3, preferably the second metallic filler material is piled over the first metallic filler material 10 and around the areas immediately adjacent thereto. An exact amount of second filler material 12 over the first metallic filler material 10 is typically not required for successful use of the invention. Similarly, determining the weight percent ratio of the first metallic filler material 10 to the subsequently applied second metallic filler material 12 is not required. This is another significant advantage of the present invention.

The second metallic filler material 12 includes between about 0 wt. % and about 40 wt. % metallic filler of a composition corresponding substantially to that of the metallic alloy article, and between about 100 wt. % and about 60 wt. % metallic filler material having the same basis as the composition of the metallic alloy article and including a melting point depressant in an amount substantially in excess of that in the metallic alloy article. The amount of melting point depressant employed typical ranges between about 1%, by weight, and about 10%, by weight. Preferably, between about 1%, by weight, and about 3%, by weight, boron is used.

The second metallic filler material 12 is also preferably powder in form. Preferably, the size of the powder particles is about 88 microns ($1 \times 10^{-6}$ m) and finer.

The metallic alloy article is then thermally processed through a heat treatment to effect an isothermal solidified repair. Specifically the heat treatment includes heating the article to a temperature above the solidus of the second metallic filler material 12, such as between about 2000° F. (1093° C.) and about 2400° F. (1316° C.) for between about 5 hours and about 30 hours, to melt the second metallic filler material 12 and isothermally solidify the repair. In this process, the second metallic filler material 12 melts and infiltrates the first metallic filler material 10 to produce a void free structure.

Alternatively, the heat treatment of the present invention may be accomplished by heating the article to a temperature (T1) capable of sintering the first metallic filler material 10, but below the solidus of the second metallic filler material 12, such as between about 1850° F. (1010° C.) and about 2200° F. (1204° C.) or alternatively, between about 2000° F. (1093° C.) and about 2400° F. (1316° C.) for about 4 hours; and then holding at a temperature (T2) above the solidus of the second metallic filler material 12, such as between about 2000° F. (1093° C.) and about 2400° F. (1316° C.) for between about 5 hours and about 30 hours, to melt the second metallic filler material 12 and isothermally solidify the repair. Accordingly, T1 will never be equivalent to T2 which will always be greater than T1.

In another embodiment of the invention, a first metallic filler paste is formed. The first metallic filler paste includes a binder and a first metallic filler material 10.

The composition of the first metallic filler material 10 corresponds substantially to that of the metallic alloy article. Alternatively, the first metallic filler material 10 may be a blend of at least two distinct metallic filler materials. One metallic filler material, present in at least 60 wt.%, corresponds substantially to that of the metallic alloy article. The other metallic filler material has the same basis as the composition of the metallic alloy article and includes a substantial amount of a melting point depressant. The amount of melting point depressant employed typically ranges between about 1%, by weight, and about 10%, by weight. Preferably, between about 1%, by weight, and about 3%, by weight, boron is used.

The binder may be any material capable of adhering to the powder such that a paste-like substance is formed. The amount of binder required is just enough to maintain the powder in suspension and one of ordinary skill in the art would be able to determine this amount. The binder must also be capable of evaporating at less than about 1200° F. (649° C.) without leaving any deleterious residue. The binder and the first metallic filler material 10 may be combined in any conventional manner, such as mixing.

Upon formation of the first metallic filler paste, the paste is applied to the defect cavity to substantially fill the cavity. The paste may be applied by any means suitable to fill the cavity. The paste is typically spread into the cavity. Excess paste is then removed.

A second metallic filler paste is provided over the first metallic filler paste. The second metallic filler paste includes a binder and a second metallic filler material 12 having between about 0 wt. % and about 40 wt. % metallic filler material of a composition corresponding substantially to that of the metallic alloy article, and between about 100 wt. % and about 60 wt. % metallic filler material having the same basis as the composition of the metallic alloy article and including a melting point depressant in an amount substantially in excess of that in the metallic alloy article. The amount of melting point depressant typically ranges between about 1%, by weight, and about 10%, by weight. Preferably, between about 1%, by weight, and about 3%, by weight, boron is used.

The binder of the second metallic filler paste may also be any material capable of adhering to the powder such that a paste-like substance is formed; and the amount of binder required is just enough to maintain the powder in suspension. The binder must also be capable of evaporating at less than 1200° F. (649° C.) without leaving a deleterious residue. The binder and the second metallic filler paste may be combined in any conventional manner, such as mixing. The second metallic filler paste is then applied directly over the first metallic filler paste in an amount sufficient to cover the first metallic filler paste and in an amount sufficient such that the second metallic filler material 12 can infiltrate the first metallic filler material 10. Typically, the second metallic filler paste is applied over the first metallic filler paste and to the areas immediately adjacent thereto. The flow of the paste during thermal processing is controlled such that the use of a mechanical dam is not necessary.

The metallic alloy article is then thermally processed to first drive off the binder. This may be accomplished by heating the article to a temperature between about 1000° F. (538° C.) and about 1200° F. (649° C.) and holding at that temperature until the binder is driven off. Alternatively, a slow heating rate, such as about 10° F./min (6° C./min), from about 400° F. (204° C.) to a temperature between about 1000° F. (538° C.) and about 1200° F. (649° C.) may be employed until the binder is driven off. Once the binder is effectively removed, the above described heat treatments may be employed to produce an isothermally solidified repair.

The following examples are provided to further explain the present invention and are meant to be exemplary rather than limiting.

EXAMPLE 1

Repairs were made to an article of nominal composition, by weight, of 9% chromium, 10% cobalt, 12.5% tungsten, 1% columbium, 2% titanium, 5% aluminum, 2% hafnium, 0.015% boron, balance nickel. The article had a defect cavity with a maximum width between about 0.010 inches ($2.5 \times 10^{-4}$ m) and about 0.030 inches ($7.6 \times 10^{-4}$ m). Base metal powder, which was about 88 microns ($1 \times 10^{-6}$ m) and finer, was combined with an aqueous binder, Omni KAO, by Omni Technologies Corporation, Exeter, N.H., to form a paste which was placed inside the defect cavity, essentially filling the volume of the defect cavity.

A second paste was formed by combining the above binder and an alloy of 10% chromium, 10% cobalt, 5% tungsten, 3% boron, balance nickel, by weight. The second paste was placed on top of the first paste in an amount sufficient to cover the first paste and the area immediately adjacent the defect cavity. The powder of the second paste (second metallic filler material) was 44 microns ($4.4 \times 10^{-5}$ m) and finer.

The article was heated to 1000° F. (538° C.) at a rate of 10° F./min (6° C./min) to drive off the binder. Then the article was heated to 2000° F. (1093° C.) and held at this temperature for 4 hours to sinter the base metal powder in the first paste. The temperature remained below the solidus of the second metallic filler material. The article was then heated to about 2200° F. (1204° C.) and held for 30 hours to melt the second metallic filler material and isothermally solidify the repair.

Upon cooling, the article was metallographically inspected to ensure a crack free structure. The article was inspected by cutting through the article and examining the microstructure under a microscope. A crack free, isothermally solidified repair appeared to have successfully occurred.

EXAMPLE 2

Repairs were made to an Inconel 713C cast superalloy having a nominal composition, by weight, of, 13.5%Cr, 4.5%Mo, 6%Al, 0.9%Ti, 2.1%Cb/Ta, 0.14%C, 0.01%B, 0.08%Zr, balance Ni. The superalloy had a through-wall defect cavity with maximum width of 0.020 inches (0.051 cm). Base metal powder, which was about 88 microns and finer, was combined with an aqueous binder, Amdry® 1290R, by Sulzer Metco (US) Inc. to form a paste which was placed inside the defect cavity to essentially fill the volume of the defect cavity.

A second paste was formed by combining the above binder with powder having a nominal composition, by weight, of 4.5%Si, 3%B, balance Ni. The particle size of the powder was about 44 microns and finer. This second paste was applied over the first paste and around the edges of the defect cavity in an amount sufficient to cover the first paste and areas adjacent thereto.

The article was then heated to 1000° F. (538° C.) at a rate of 10° F./min (6° C./min) to drive off the binder. Then the article was heated to 2050° F. (1121° C.) and held at 2050° F. (1121° C.) for 12 hours. The article was then air cooled.

As in Example 1, the article was metallographically examined and appeared to result in a successful, crack free, isothermally solidified repair.

EXAMPLE 3

Repairs were made to a Mar-M509 cast cobalt base superalloy of nominal composition, by weight, of 23.4%Cr, 10%Ni, 7%W, 3.5%Ta, 0.6%C, 0.2%Ti, 0.5%Zr, balance Co. The superalloy had a 0.030 inch (0.076 cm) diameter through hole defect.

A first paste was placed into the defect cavity to essentially fill the volume of the defect cavity. The first paste included a powder alloy mix of the following: 70 wt. % powder having the same composition as the base metal and 30 wt. % powder having a nominal composition, by weight, of 25%Ni, 23.4%Cr, 3%B, balance Co. The powder particles were about 88 microns and finer. The powder alloy mix was combined with the same binder as in Example 2 to form a paste-like consistency.

A second paste was formed by combining the above binder with a powder alloy mix of the follow: 60 wt.% powder having a nominal composition, by weight, of 40%Ni, 24.5%Cr, 2.95%B, balance Co and 40 wt. % powder having the same composition as the base metal. The particle size of the powder was about 44 microns and finer. This second paste was applied to both sides of the defect cavity, covering the entire defect opening and first paste.

The article was then heated to 1000° F. (538° C.) at a rate of 10° F./min (6° C./min) to drive off the binder. Then the article was heated to 2100° F. (1149° C.) and held at 2100° F. (1149° C.) for 12 hours. The article was then air cooled.

As in the above examples, the article was metallographically examined and appeared to result in a successful, crack free, isothermally solidified repair.

An advantage of the present invention includes the ability to repair wide gap defects in metallic alloy articles by achieving isothermal solidification and minimal porosity in the repaired area.

Another advantage of the present invention is the ability to repair gas turbine blade and vane cooling holes by achieving an isothermally solidified structure with minimal porosity.

Yet another advantage of the present invention is that it may be employed to join metallic articles, as well as repair them.

The invention is not limited to the particular embodiments shown and described herein. Various changes and modifications may be made without departing from the spirit and scope of the claimed invention.

We claim:

1. A method of repairing a metallic alloy article having a defect cavity greater than about 0.010 inches ($2.54 \times 10^{-4}$ m) in maximum width, the method comprising the steps of:

providing a first metallic filler material in the defect cavity such that the metallic filler material substantially fills the cavity, the composition of the first metallic filler material corresponding substantially to that of the metallic alloy article;

providing a second metallic filler material over the first metallic filler material, wherein the second metallic filler material includes between about 0 wt. % and about 40 wt. % metallic filler material of a composition corresponding substantially to the metallic alloy article, and between about 100 wt. % and about 60 wt. % metallic filler material having the same basis as the composition of the metallic alloy article and including a melting point depressant in an amount substantially in excess of that in the metallic alloy article;

effecting isothermal solidification by thermally processing the article through a heat treatment comprising:

heating the article to a temperature above the solidus of the second metallic filler material to melt the second metallic filler material and isothermally solidify repair of the defect cavity greater than about 0.010 inches ($2.54 \times 10^{-4}$ m) in maximum width.

2. The method of claim 1 wherein the metallic alloy article is a nickel base superalloy article.

3. The method of claim 1 wherein the defect cavity has a maximum width between about 0.010 inches ($2.5 \times 10^{-4}$ m) and about 0.030 inches ($7.6 \times 10^{-4}$ m).

4. The method of claim 1 wherein surface oxides are removed from the defect cavity prior to providing the first metallic filler material in the defect cavity.

5. The method of claim 1 wherein the metallic alloy article comprises a composition in weight percent of 9% chromium, 10% cobalt, 12.5% tungsten, 1% columbium, 2% titanium, 5% aluminum, 2% hafnium, 0.015% boron, balance nickel.

6. The method of claim 1 wherein between about 1% and 3%, boron, by weight, is present as the melting point depressant in the second metallic filler material.

7. The method of claim 1 wherein the article is heated to between about 2000° F. (1093° C.) and about 2400° F. (1316° C.) for between about 5 hours and about 30 hours, whereby the second metallic filler material melts and infiltrates the first metallic filler material to produce a void free structure.

8. A method of repairing a metallic alloy article having a defect cavity, the method comprising the steps of:

providing a first metallic filler material in the defect cavity such that the metallic filler material substantially fills the cavity, the composition of the first metallic filler material corresponding substantially to that of the metallic alloy article;

providing a second metallic filler material over the first metallic filler material, wherein the second metallic filler material includes between about 0 wt. % and about 40 wt. % metallic filler material of a composition corresponding substantially to the metallic alloy article, and between about 100 wt. % and about 60 wt. % metallic filler material having the same basis as the composition of the metallic article and including a melting point depressant in an amount substantially in excess of that in the metallic alloy article;

effecting isothermal solidification by thermally processing the article through a heat treatment comprising:

heating the article to a temperature (T1) capable of sintering the first metallic filler material, but below the solidus of the second metallic filler material, such as between about 2000° F. (1093° C.) and about 2400° F. (1316° C.) for about 4 hours; and then holding at a temperature (T2) above the solidus of the second metallic filler material, such as between about 2000° F. (1093° C.) and about 2400° F. (1316° C.) for between about 5 hours and about 30 hours to melt the second metallic filler material and isothermally solidify the repair, whereby T2 is greater than T1.

9. A method of repairing a metallic alloy article having a defect cavity greater than about 0.010 inches ($2.5 \times 10^{-4}$ m) in maximum width, the method comprising the steps of:

providing a first metallic filler paste in the defect cavity such that the metallic filler paste substantially fills the cavity, the metallic filler paste comprising a binder and a first metallic filler material having composition corresponding substantially to that of the metallic alloy article;

providing a second metallic filler paste over the first metallic filler paste, wherein the second metallic filler paste comprises a binder and a second metallic filler material having between about 0 wt. % and about 40 wt. % metallic filler material of a composition corresponding substantially to the metallic article, and between about 100 wt. % and about 60 wt. % metallic filler material having the same basis as the composition of the metallic alloy article and including a melting point depressant in an amount substantially in excess of that in the metallic alloy article;

effecting isothermal solidification by thermally processing the article through a heat treatment by:

heating the article to a temperature between about 1000° F. (538° C.) and about 1200° F. (649° C.) and holding at that temperature until the binder is driven off;

holding at a temperature capable of sintering the first metallic filler material of the first metallic filler paste, but below solidus of the second metallic filler paste, between about 1850° F. (1010° C.) and about 2200° F. (1204° C.) for about 4 hours; and holding at a third temperature, between about 2000° F. (1093° C.) and about 2400° F. (1316° C.) for between about 5 hours and about 30 hours, to melt the second metallic filler paste and thereby isothermally solidify a repair of the defect cavity greater than about 0.010 inches ($2.5 \times 10^{-4}$ m) in maximum width.

10. A method of repairing a metallic alloy article having a defect cavity, the method comprising the steps of:

providing a first metallic filler material in the defect cavity such that the metallic filler material substantially fills the cavity, wherein the first metallic filler material is a blend of at least two distinct metallic filler materials, one metallic filler material, present in at least 60 wt.%, corresponds substantially in composition to that of the metallic alloy article, and another metallic filler material has the same basis as the metallic alloy article and includes a melting point depressant in an amount substantially in excess of that in the article;

providing a second metallic filler material over the first metallic filler material, wherein the second metallic filler material includes between about 0 wt. % and about 40 wt. % metallic filler material of a composition corresponding substantially to the metallic alloy article, and between about 100 wt. % and about 60 wt. % metallic filler material having the same basis as the metallic alloy article and including a melting point depressant in an amount substantially in excess of that in the metallic alloy article;

effecting isothermal solidification by thermally processing the article through a heat treatment comprising:

heating the article to a temperature above the solidus of the second metallic filler material to melt the second metallic filler material and isothermally solidify the repair.

* * * * *